United States Patent
Hasan et al.

(10) Patent No.: US 9,832,382 B2
(45) Date of Patent: Nov. 28, 2017

(54) IMAGING APPARATUS AND IMAGING METHOD FOR OUTPUTTING IMAGE BASED ON MOTION

(71) Applicant: SAMSUNG ELECTRONICS CO., LTD., Suwon-si (KR)

(72) Inventors: Muhammad Kamrul Hasan, Suwon-si (KR); Kai Guo, Suwon-si (KR); Nak-hoon Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/739,074

(22) Filed: Jun. 15, 2015

(65) Prior Publication Data

US 2016/0112640 A1    Apr. 21, 2016

(30) Foreign Application Priority Data

Oct. 16, 2014 (KR) .................. 10-2014-0140075

(51) Int. Cl.
| | |
|---|---|
| *H04N 5/232* | (2006.01) |
| *H04N 5/235* | (2006.01) |
| *H04N 5/353* | (2011.01) |
| *H04N 5/343* | (2011.01) |
| *H04N 9/04* | (2006.01) |

(52) U.S. Cl.
CPC ....... *H04N 5/23267* (2013.01); *H04N 5/2327* (2013.01); *H04N 5/2353* (2013.01); *H04N 5/23258* (2013.01); *H04N 5/353* (2013.01); *H04N 5/23245* (2013.01); *H04N 5/343* (2013.01); *H04N 9/045* (2013.01)

(58) Field of Classification Search
CPC .......... H04N 5/23267; H04N 5/23258; H04N 5/23264; H04N 5/2327; H04N 5/2353; H04N 5/23245
USPC .......................................... 348/208.2, 208.4
See application file for complete search history.

(56) References Cited

U.S. PATENT DOCUMENTS

| | | |
|---|---|---|
| 7,952,612 B2 | 5/2011 | Kakkori |
| 8,482,618 B2 | 7/2013 | Lin |
| 2007/0296833 A1 | 12/2007 | Corcoran et al. |
| 2008/0100716 A1 | 5/2008 | Fu et al. |
| 2009/0040318 A1 | 2/2009 | Brosnan et al. |

(Continued)

FOREIGN PATENT DOCUMENTS

| | | |
|---|---|---|
| JP | 06-109449 A | 4/1994 |
| JP | 2006-020096 A | 1/2006 |

(Continued)

OTHER PUBLICATIONS

Search Report dated Nov. 18, 2015, issued by the International Searching Authority in counterpart International Application No. PCT/KR2015/007625 (PCT/ISA/210).

(Continued)

*Primary Examiner* — Nhan T Tran
(74) *Attorney, Agent, or Firm* — Sughrue Mion, PLLC

(57) ABSTRACT

An imaging apparatus and an imaging method are provided. The imaging apparatus includes an imager configured to output image data for a subject, a motion detector configured to detect motion of the imaging apparatus, and a controller configured to control the imager to suspend output of the image data in response to the motion detector detecting the motion.

22 Claims, 17 Drawing Sheets

(56) References Cited

U.S. PATENT DOCUMENTS

| | | |
|---|---|---|
| 2009/0086057 A1 | 4/2009 | Han et al. |
| 2011/0109755 A1 | 5/2011 | Joshi et al. |
| 2011/0211758 A1 | 9/2011 | Joshi et al. |
| 2012/0019678 A1* | 1/2012 | Fujita ................ H04N 5/23245 348/208.4 |
| 2012/0224072 A1* | 9/2012 | Koo ................... H04N 5/23267 348/208.2 |
| 2013/0044230 A1 | 2/2013 | Zhou |
| 2013/0259199 A1* | 10/2013 | Ueji ..................... G06T 11/005 378/70 |
| 2014/0055638 A1 | 2/2014 | Son et al. |
| 2014/0085495 A1 | 3/2014 | Almalki et al. |
| 2014/0294370 A1* | 10/2014 | Lin .................... H04N 5/23258 396/53 |
| 2015/0358546 A1* | 12/2015 | Higashiyama ..... H04N 5/23258 348/208.2 |
| 2016/0014340 A1* | 1/2016 | Kim ................... H04N 5/23293 348/208.11 |

FOREIGN PATENT DOCUMENTS

| | | | | |
|---|---|---|---|---|
| JP | 2006-311145 A | | 11/2006 | |
| JP | 2010127903 A | * | 6/2010 | ............... G01T 1/24 |
| JP | 2016039494 A | * | 3/2016 | ............. H04N 5/341 |
| KR | 10-2009-0015840 A | | 2/2009 | |
| KR | 10-2014-0027816 A | | 3/2014 | |
| WO | 2007/031808 A1 | | 3/2007 | |

OTHER PUBLICATIONS

Written Opinion dated Nov. 18, 2015, issued by the International Searching Authority in counterpart International Application No. PCT/KR2015/007625 (PCT/ISA/237).

Communication dated Sep. 20, 2017, from the European Patent Office in counterpart European Application No. 15850759.0.

* cited by examiner

IMAGING APPARATUS AND IMAGING METHOD FOR OUTPUTTING IMAGE BASED ON MOTION

CROSS-REFERENCE TO RELATED APPLICATION

This application claims priority from Korean Patent Application No. 10-2014-0140075, filed on Oct. 16, 2014, in the Korean Intellectual Property Office, the disclosure of which is incorporated herein by reference in its entirety.

BACKGROUND

1. Field

Apparatuses and methods consistent with exemplary embodiments relate to an imaging apparatus and an imaging method.

2. Description of the Related Art

Blur is a phenomenon that an image is imaged in a defocused state, and a depth of field is shallow. An image having the blur may be intentionally imaged to obtain an artistic aesthetic sense, but in many cases of obtaining a sharp image, image quality may be degraded due to the blur. Despite an intention to photograph a sharp image, one of the reasons that cause the blur in the imaged image may be shaking of a camera while imaging.

Technology for removing the blur generated in an image imaged through a digital camera has been suggested. However, the technology is a method of removing the blur by detecting the blur existing in the imaged image and image-processing the detected blur, and high calculation complexity may be needed. Therefore, in response to a blur removal operation being performed in an apparatus having relatively low calculation capacity and resources, such as a mobile apparatus or a digital camera, a data processing rate may be lowered, and thus usability may be reduced.

Therefore, there is a need for technology capable of efficiently removing a blur from an image.

SUMMARY

Exemplary embodiments address at least the above disadvantages and other disadvantages not described above. Also, exemplary embodiments are not required to overcome the disadvantages described above, and may not overcome any of the problems described above.

Exemplary embodiments are to provide an imaging apparatus and an imaging method that are capable of efficiently removing blur from an image.

According to an aspect of an exemplary embodiment, there is provided an imaging apparatus including an imager configured to output image data for a subject, a motion detector configured to detect motion of the imaging apparatus, and a controller configured to control the imager to suspend output of the image data in response to the motion detector detecting the motion.

The imager may be configured to output the image data in line units.

The imager may include a complementary metal oxide semiconductor sensor.

The motion detector may include at least one among an acceleration sensor, an angular velocity sensor, and a gyroscope.

The motion detector may be configured to continuously detect the motion, and the controller may be configured to control the imager to suspend output of the image data in response to determining that the motion is equal to or larger than a value, and further configured to output the image data in response to determining that the motion is less than the value.

The imaging apparatus may further include an image processor configured to process the output image data.

The controller may be further configured to control the image processor to generate an image based on the output image data for a plurality of images in response to the imager outputting the image data.

The controller may be further configured to set ranks for a plurality of images based on the detected motion corresponding to the output image data for the plurality of images in response to the imager outputting the image data.

The controller may be further configured to control the image processor to generate an image based on the set ranks.

The controller may be further configured to control the image processor to generate an image based on the output image data in response to the imager outputting the image data of a number of images.

According to an aspect of another exemplary embodiment, there is provided an imaging apparatus including an imager configured to output image data for a subject, a motion detector configured to detect motion of the imaging apparatus, and a controller configured to exclude an image from image synthesis of the output image data in response to the motion detector detecting the motion.

The imager may include a charge-coupled device sensor.

The imager may be configured to output the image data in frame units.

The controller may be further configured to determine a number of motion data to be detected by the motion detector, based on imaging environment conditions.

According to an aspect of another exemplary embodiment, there is provided an imaging method of an imaging apparatus, the imaging method including outputting image data for a subject, detecting motion of the imaging apparatus, and suspending output of the image data in response to the detecting of the motion.

The imaging method may further include outputting the image data in response to determining that the motion is less than a value, and the suspending the output of the image data may include suspending output of the image data in response to determining that the motion is equal to or larger than the value.

The imaging method may further include determining whether a number of images of the output image data is greater than or equal to a value, and processing the output image data in response to the determining that the number of images is greater than or equal to the value, to generate an image.

According to an aspect of another exemplary embodiment, there is provided an imaging apparatus including an image sensor configured to output image data, a motion detector configured to detect motion of the imaging apparatus, a controller configured to select the output image data while the motion detector detects an absence of motion of the imaging apparatus, and an image processor configured to synthesize an unblurred image based on the selected image data.

BRIEF DESCRIPTION OF THE DRAWINGS

The above and/or other aspects will be more apparent by describing in detail exemplary embodiments with reference to the accompanying drawings, in which.

DETAILED DESCRIPTION OF THE EXEMPLARY EMBODIMENTS

Figure 1:
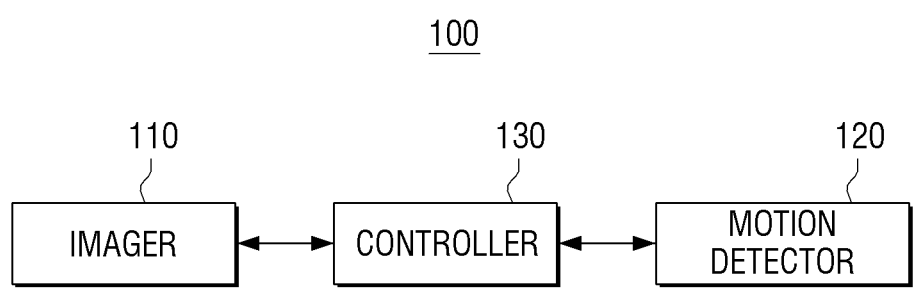
FIG. 1 is a block diagram illustrating a configuration of an imaging apparatus according to an exemplary embodiment.

Hereinafter, exemplary embodiments are described in more detail with reference to the accompanying drawings.

In the following description, like reference numerals are used for like elements even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the exemplary embodiments with unnecessary detail.

It will be understood that the terms such as "unit," "-er (-or)," and "module" described in the specification refer to an element configured to perform at least one function or operation, and may be implemented in hardware or a combination of hardware and software.

FIG. 1 is a block diagram illustrating a configuration of an imaging apparatus 100 according to an exemplary embodiment.

Referring to FIG. 1, the imaging apparatus 100 includes an imager 100, a motion detector 120, and a controller 130.

The imager 110 is configured to image a subject, and output image data of the subject. For example, in response to light reflected from the subject incident to a lens of the imager 110, an image of the subject may be formed in an image sensor of the imager 110. The formed image, that is, photocharges accumulated in the image sensor, may be output as the image data.

The motion detector 120 is configured to detect motion data of the imaging apparatus 100 while the image data is captured, that is, the image data of the image sensor is read out. The motion detector 120 may include various motion sensors. For example, the motion detector 120 may include at least one among an acceleration sensor, an angular velocity sensor, a gyroscope, and a geomagnetic sensor.

The acceleration sensor is configured to sense variation of speed per unit time. For example, the acceleration sensor may be implemented with a two-axis acceleration sensor or a three-axis acceleration sensor.

If the acceleration sensor is implemented with the three-axis acceleration sensor, the acceleration sensor includes X-axis, Y-axis, and Z-axis acceleration sensors that are arranged in different directions perpendicular to each other. The acceleration sensor converts output values of the X-axis, Y-axis, and Z-axis acceleration sensors to digital values, and outputs the converted digital values to a sensing value processor. For example, the sensing value processor may include a chopping circuit, an amplification circuit, a filter, an analog-to-digital converter (ADC), and the like. The sensing value processor performs chopping, amplification, and filtering on an electric signal output from the three-axis acceleration sensor, and then converts the processed electric signal to a digital voltage value.

The angular velocity sensor is configured to sense angular velocity by sensing motion variation of the imaging apparatus 100 in a preset direction per unit time. For example, the angular velocity sensor may be implemented with a three-axis gyroscope.

If the angular velocity sensor is implemented with the three-axis gyroscope, the angular velocity sensor obtains motion data according to the following Equation 1. Variables x, y, and z indicate three-axis coordinate values.

$$\text{Motion data} = \sqrt{(x_n - x_{n-1})^2 + (y_n - y_{n-1})^2 + (z_n - z_{n-1})^2} \quad (1)$$

In another example, the motion detector 120 may include a six-axis sensor using a three-axis acceleration sensor and a three-axis angular velocity sensor. The motion detector 120 may detect motion of the imaging apparatus 100 using the 6-axis sensor while the image is imaged.

The controller 130 is configured to control an overall operation of the imaging apparatus 100. The controller 130 controls the imager 110 to stop output of the image data in response to the detected motion data being equal to or larger than a preset value. In detail, in response to the motion data detected through the motion detector 120 being equal to or larger than a threshold value, the controller 130 controls the imager 110 to stop readout of the image data. This is based on a correlation between a motion detection value according to the motion of the imaging apparatus 100 and a degree of blur in a generated image. That is, in response to the imaging apparatus 100 being moved quickly (a speed) per unit time, or being moved by a large displacement (a distance) per unit time, the degree of blur in the imaged image is intensified. Therefore, in response to the motion data of the imaging apparatus 100 being equal to or larger than the preset value, the controller 130 infers that the read-out image data will generate a blurred image, and suspend the readout to be stopped.

The motion detector 120 continuously detects the motion of the imaging apparatus 100, and transfers the detected motion to the controller 130. In response to the detected motion being equal to or larger than the preset value, the controller 130 allows the output of the image data to be stopped, and the controller 130 continuously checks the motion. Then, in response to motion data (detected after the suspension of the image data) being less than the preset value, the controller 130 controls the imager 110 to restart the output of the image data. That is, in response to the reduced motion of the imaging apparatus 100 being determined, and thus the blurred image not being generated or an image having low degree of blur being generated, the image data of the image sensor may be read out. Through the above-described method, an optimum exposure trigger point of the image sensor may be determined in the exemplary embodiment.

For example, the controller 130 may include a hardware configuration including a micro processing unit (MPU), a central processing unit (CPU), a cache memory, and a data bus, and a software configuration including an operating system and an application that performs a purpose. Control commands for components for the operation of the imaging apparatus 100 may be read out from a memory according to a system clock, and the controller 130 may generate electric signals according to the read control commands, and operate the components of the hardware configuration.

Figure 2:
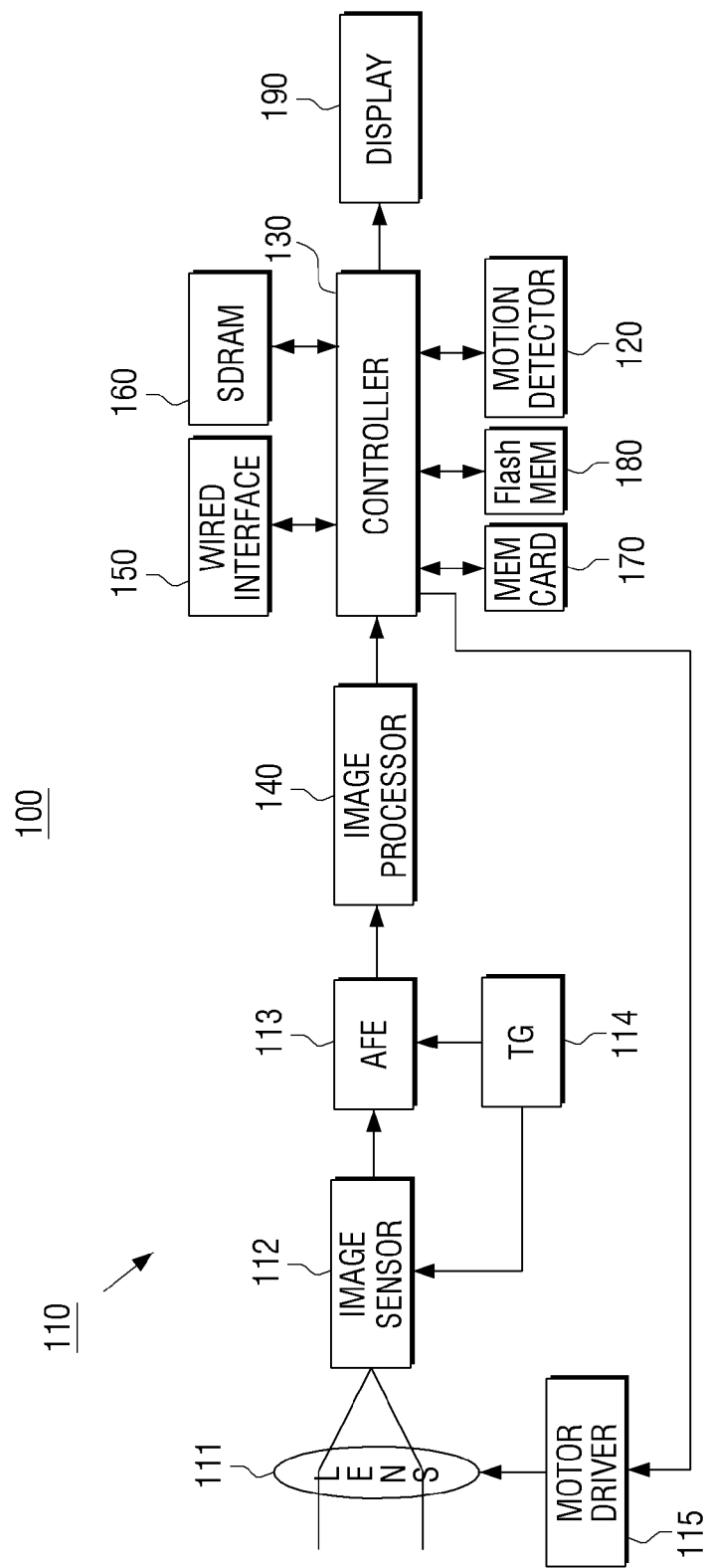
FIG. 2 is a block diagram illustrating a detailed configuration of the imaging apparatus.

FIG. 2 is a block diagram illustrating a detailed configuration of the imaging apparatus 100.

Referring to FIG. 2, the imaging apparatus 100 further includes an image processor 140, a wired interface 150 (for example, universal serial bus (USB) interface), a synchronous dynamic random access memory (SDRAM) 160, a memory (MEM) card 170, a flash memory (MEM) 180, and a display 190 in addition to the imager 110, the controller 130, and the motion detector 120.

The imager 110 includes a lens 111, an image sensor 112, a timing generator (TG) 114, an analog front end (AFE) 113, and a motor driver 115.

The lens 111 is a component upon which light reflected from a subject is incident. For example, the lens 111 may include at least among a zoom lens configured to control an angle of view to be reduced and increased according to a focal distance, and a focus lens configured to adjust a focus of the subject. The lens 111 may be accommodated in a lens barrel of the imaging apparatus 100, and the lens 111 is moved by a driving signal of the motor driver 115 to adjust the focus. For example, the lens barrel may include a shutter and an iris, and the shutter and the iris may control an amount of light incident to the lens 111 through a driving motor.

The image sensor 112 is configured to form an image of the subject passing through the lens 111. The image sensor 112 includes a plurality of pixels arranged in a matrix form. For example, the plurality of pixels may form a Bayer pattern. Each of the plurality of pixels accumulates photocharges according to the incident light, and outputs an image by the photocharges as an electric signal. For example, the image sensor 112 may include a complementary metal oxide semiconductor (CMOS) sensor and a charge-coupled device (CCD) sensor to be described later. For example, the plurality of pixels may include a plurality of phase difference pixels.

The AFE 113 is configured to sample the electric signal of the image of the subject that is output from the image sensor 112, and digitalize the electric signal. The AFE 113 is controlled by the controller 130.

The TG 114 outputs a timing signal for the AFE 113 to read out pixel data of the image sensor 112. The TG 114 is controlled by the controller 130.

However, the AFE 113 and the TG 114 may be designed with other replaceable components. For example, if the image sensor 112 is implemented with a CMOS sensor, the configuration of the AFE 113 and the TG 114 may be unnecessary.

The motor driver 115 is configured to adjust the focus by driving the focus lens according to a control of the controller 130.

The image processor 140 is configured to process raw image data output from the image sensor 112. The image processor 140 may perform image processing on the raw image data, and the processed raw image data may be stored in the SDRAM 160. The controller 130 may control the display 190 to display the image-processed data of the SDRAM 160.

The wired interface 150 is configured to provide an interface with an external apparatus. The wired interface 150 performs transmission and reception processing on the image data in response to the wired interface 150 being coupled to a personal computer (PC) or other external apparatuses through a wired cable. Further, the wired interface 150 may perform firmware transmission and reception processing for firmware upgrade. The wired interface 150 may include at least one high-speed wired interface cable terminal among a high-definition multimedia interface (HDMI), a mobile high-definition link (MHL), and a digital interactive interface for video and audio (DiiVA), and a processor.

The SDRAM 160 is configured to store an image, and to be used for an image processing operation in the image processor 140 or the controller 130. For example, the SDRAM 160 may be implemented with a double data rate (DDR) SDRAM, which may improve data output twice by outputting data at a rising edge and a falling edge of the system clock as compared with a DRAM that may output data only at the rising edge of the system clock.

The flash memory 180 is configured to store a firmware program, various pieces of adjustment information complying with a specification of the imaging apparatus 100, setup information of the imaging apparatus 100 by a user input, an imaged image file, and the like.

The memory card 170 is configured to include a flash memory, and may be attachable and detachable to and from the imaging apparatus 100. The memory card 170 is configured to store an imaged image file.

The display 190 is configured to display at least one among a user interface including text, an icon, and the like, electronic apparatus information, a live view image, a moving image, and a still image. The display 190 may perform an electronic viewfinder function.

FIGS. 3 to 7 are views illustrating methods of reading out an image data value according to exemplary embodiments.

Figure 3:
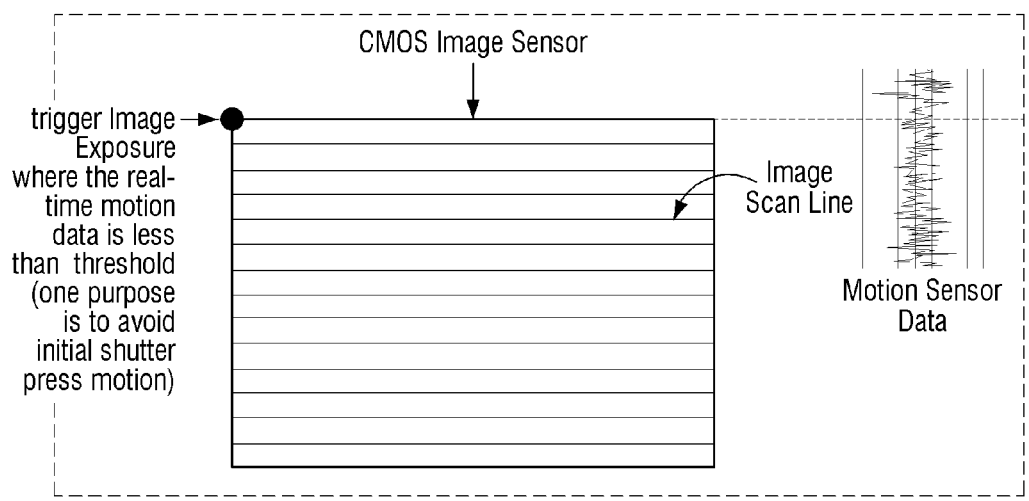
FIGS. 3 to 7 are views illustrating methods of reading out image data according to exemplary embodiments.

As described above, the imager 110 of the imaging apparatus 100 according to an exemplary embodiment may include a CMOS sensor. A camera in which the CMOS sensor is installed may read out image data in line units. Therefore, as illustrated in FIG. 3, readout is sequentially performed on pixels of the image sensor 112 from a first pixel (i.e., where image exposure is triggered) to a last pixel. That is, the imager 110 may output image data for a subject in line units including an image scan line.

Figure 4:
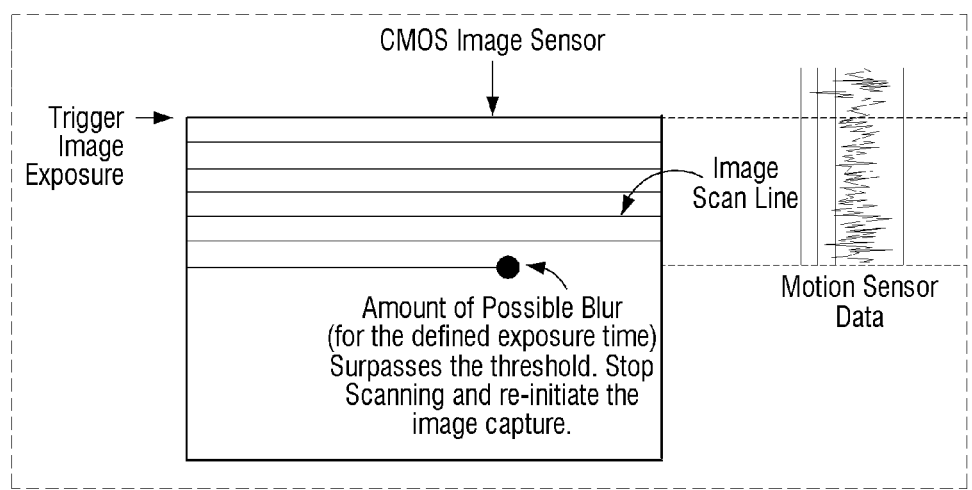

As described above, the motion detector 120 continuously detects motion data of the imaging apparatus 100 while the image data is output. While the motion data of the imaging apparatus 100 is detected, in response to the detected motion data being equal to or larger than a preset value, the controller 130 controls the imager 110 to stop the output of the image data. In FIG. 4, while the readout is performed on the pixels of the image sensor 112 from the first pixel in line units, in response to the detected motion data being equal to or larger than the preset value, it is inferred that blur is heavily generated (i.e., an amount of possible blur for a defined exposure time surpasses a threshold) in an image finally generated. Therefore, the controller 130 allows the output of the image data to be stopped.

As described above, this is based on a correlation between a motion detection value according to motion of the imaging apparatus 100 and a degree of blur included in a generated final image. That is, in response to the imaging apparatus 100 being moved quickly (a speed) per unit time, or being moved by a large displacement (a distance) per unit time, the degree of blur in the imaged image is intensified. Therefore, in response to the motion data of the imaging apparatus 100 being equal to or larger than the preset value, the controller 130 infers that the readout image data generates a blurred image, and allows the readout to be stopped.

As described above, the controller 130 continuously checks the motion of the imaging apparatus 100, and simultaneously controls the imager 110 to stop the output of the image data in response to the motion data being equal to or larger than the preset value, and to restart the output of the image data in response to motion data (detected after the stopping of the output of the image data) being less than the preset value. That is, in response to the motion of the imaging apparatus 100 being determined to be small, a blurred image is not generated or an image having a low degree of blur is to be generated, and the readout for the image data of the image sensor 112 restarts. Because the readout is performed in image frame units, a start point of the readout is the first pixel of the image sensor 112.

As described above, because the exemplary embodiment determines the degree of blur based on the motion data of the imaging apparatus 100, and removes, from the image data, an image having a high degree of blur in an image readout operation, the blurred image data may be culled from the image data before the raw image data is processed in the image processor 140. System resources may be largely consumed in raw image data processing, and thus computational complexity may be increased and usability of an apparatus may be reduced. The exemplary embodiment infers generation of an image having the high degree of blur in advance of the image readout operation, and allows the generation of the image having the high degree of blur to be stopped based on the inference.

Figure 5:
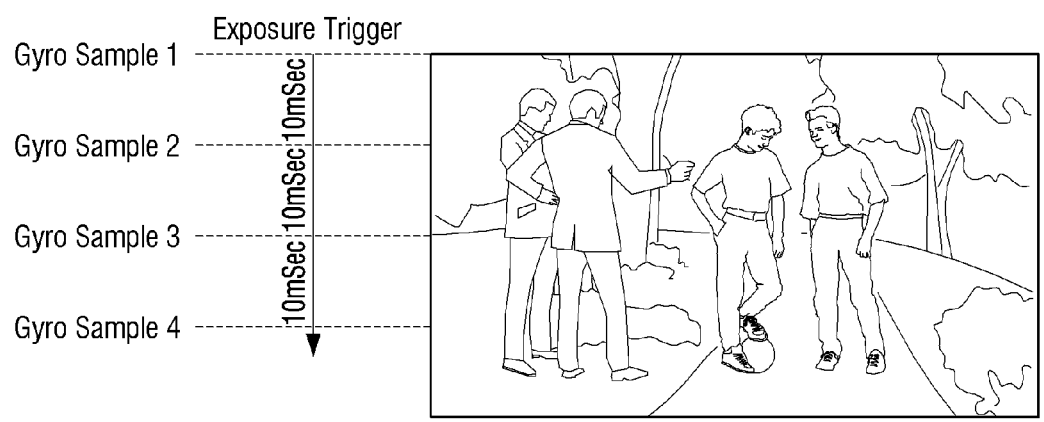

The motion detector 120 may detect motion of the imaging apparatus 100 from a light exposure trigger point of the image sensor 112. As described above, a gyroscope may be used to detect the motion of the imaging apparatus 100. In response to 10 ms being needed for motion information detection and transmission of the gyroscope, and 40 ms being needed to output all image data from the light exposure trigger point of the image sensor 112, as illustrated in FIG. 5, a sampling of the gyroscope is performed at least four times while one image frame is read out. In response to any one of four sampling values of the gyroscope being equal to or larger than a threshold value, the controller 130 allows the output of the image data to be immediately stopped.

Figure 6:
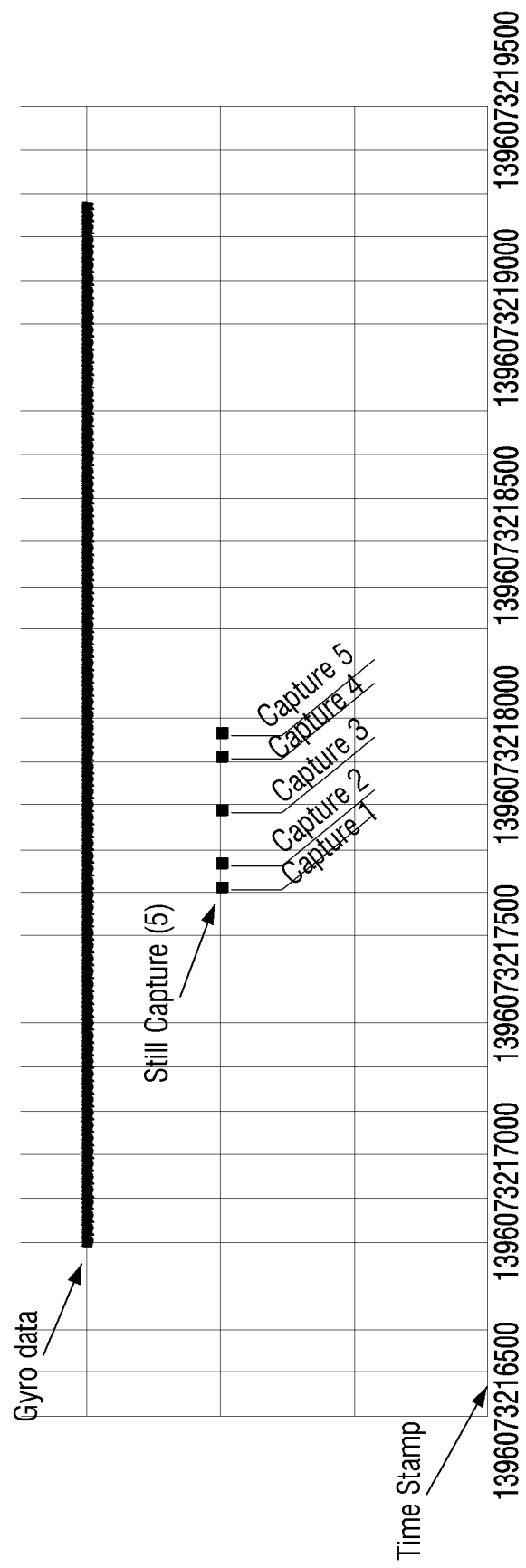

FIG. 6 illustrates frequency of image capturing in response to motion information of the imaging apparatus 100 being continuously detected through a gyroscope over time, and thinning out of a blurred image being suitably performed based on the motion information in the exemplary embodiment.

Figure 7:
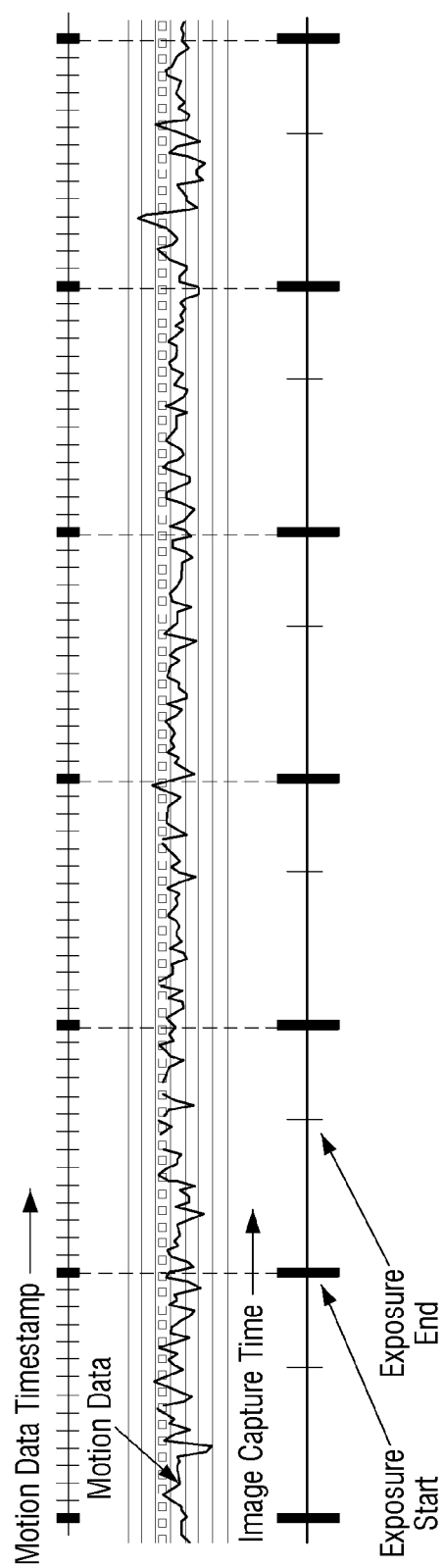

FIG. 7 illustrates variation of motion data between an exposure start time and an exposure end time of the image sensor. In response to the motion data value being equal to or larger than a threshold value, a light exposure or an image capture is completed. However, in response to the motion data value of less than the threshold value being maintained, image data for one full image frame is output.

The image capturing is in synchronization with the motion information detection of the imaging apparatus 100. That is, the motion information detection is performed at a preset time interval, and the image capturing corresponding to the motion information detection is simultaneously performed after the preset time interval. A determination of whether the motion information detected during the image capturing is equal to or larger than the threshold value is performed, and the image capturing is stopped in response to the detected motion information being equal to or larger than the threshold value. After a point of time when the image capturing may not be stopped but may be completed, next motion information of the imaging apparatus 100 is detected, and the imaging capturing corresponding thereto starts.

The imager 110 outputs the image data value, and the image processor 140 processes the output image data value to generate an image. As illustrated in FIG. 6, in response to one imaging being performed, the image sensor 112 is repeatedly read out, and a plurality of pieces of raw image data is generated. At this time, the controller 130 may control the image processor 140 to generate one image using the plurality of pieces of raw image data. In response to one final image being generated by synthesizing the plurality of images, image quality may be improved, and a sharper image may be obtained in response to the imaging being performed in a low light condition. The imaging apparatus 100 according to an exemplary embodiment may image a plurality of images having the low degree of blur, synthesize the plurality of images, and obtain a final image based on the synthesized plurality of images. Therefore, the imaging apparatus 100 capable of efficiently removing blur from an image may be provided.

Figure 8:
FIG. 8 is a view illustrating a final image in response to continuous shooting being performed without use of the above-described technical features.

FIG. 8 is a view illustrating a final image in response to continuous shooting being performed without use of the above-described technical features.

As illustrated in FIG. 8, a degree of blur is serious in partial images. In response to a final image being obtained by synthesizing a plurality of continuously imaged images through the above-described method, image quality may be degraded, and thus it may be difficult to obtain a sharp image. A number of images to be synthesized may be increased to obtain the sharp image. However, because a number of generated images is increased, computational complexity may be entirely increased, efficiency may be degraded, and thus usability may be reduced due to low speed.

In response to image data for a plurality of images according to continuous shooting being output from the imager 110, the controller 130 may set ranks for the plurality of images based on the motion data of the imaging apparatus 100 corresponding to the image data for the plurality of images. That is, the controller 130 may divide the images according to a degree of blur probability, and set the ranks for the divided images. As described above, in response to the degree of blur being high, that is, in response to the degree of blur being equal to or larger than the threshold value, the controller 130 allows image generation to be stopped. However, in response to the degree of blur being low, the controller 130 may set the ranks according to the degree of blur between the generated images, that is, according to a degree of motion of the imaging apparatus 100.

Figure 9:
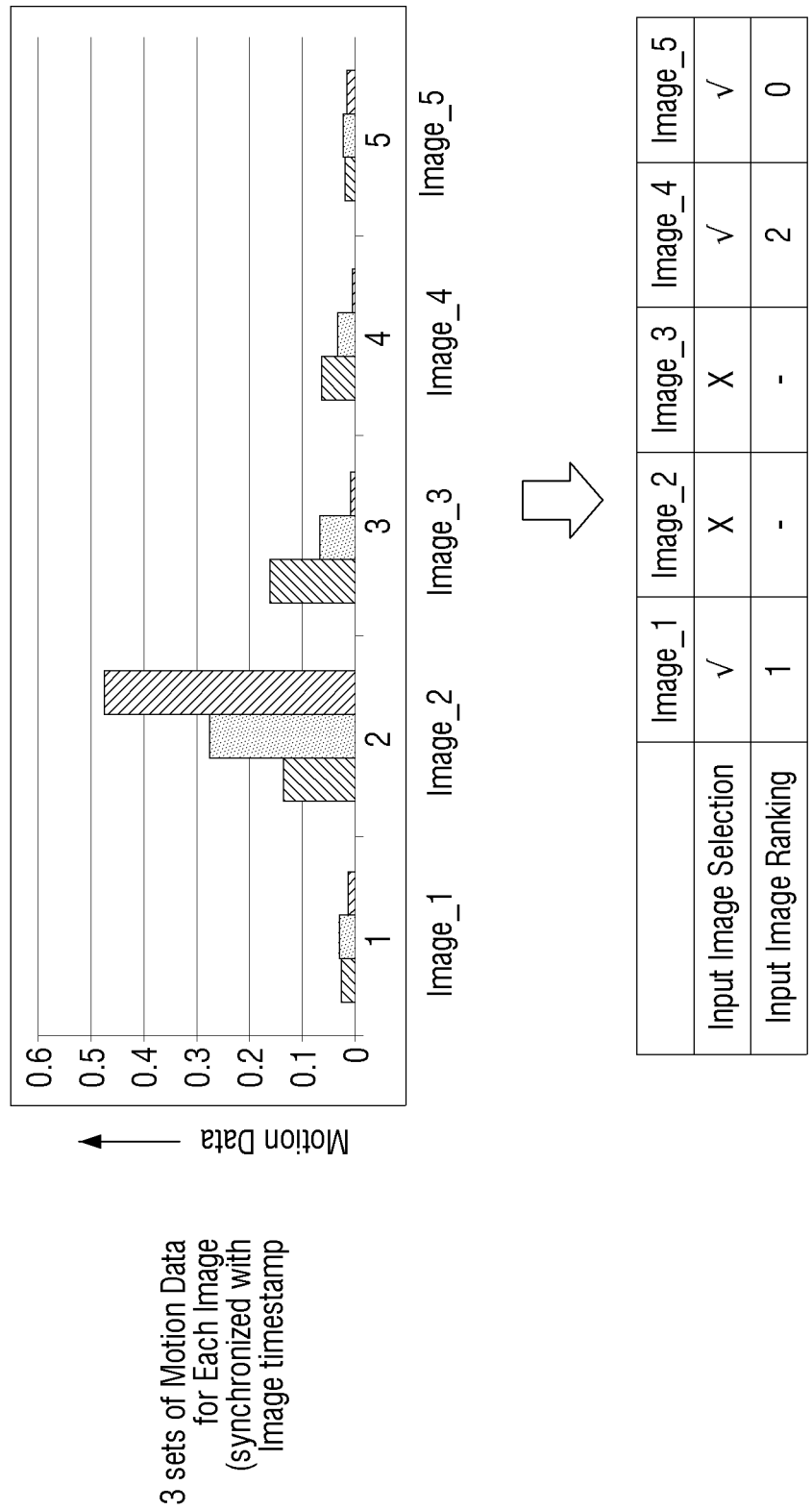
FIG. 9 is a view illustrating a method of setting ranks to generated images according to an exemplary embodiment.

FIG. 9 is a view illustrating a method of setting ranks to generated images according to an exemplary embodiment.

As illustrated in FIG. 9, the controller 130 sets a rank 0 to an image 5 having the smallest motion among generated images, and sets a rank 2 to an image 4 having the largest motion among the generated images. Because an image 2 and an image 3 have motions of a threshold value or more, readout is stopped, and the images are not generated.

The rank information may be used for final image synthesis. That is, the controller 130 may control the image processor 140 to select only an image having the highest rank (having a smallest rank value) among a plurality of images, and generate a final image based on the selected image. Further, the controller 130 may generate a thumbnail image using the image having the highest rank. Different weights may be applied to images according to the ranks, and may be used for final image synthesis.

Figure 10:
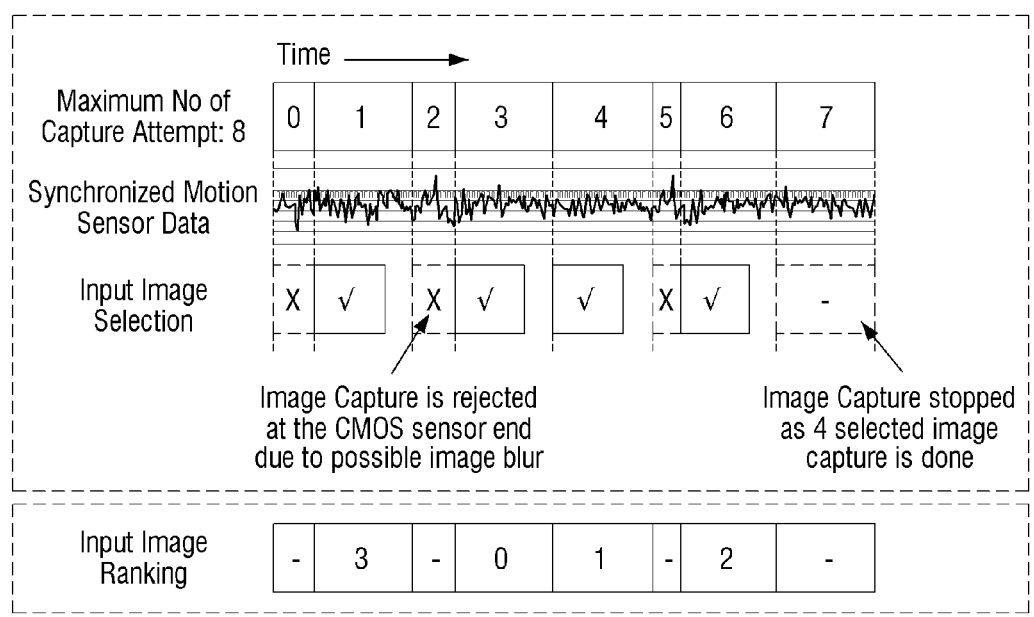
FIG. 10 is a view illustrating a method of generating a preset number of images for image synthesis according to an exemplary embodiment.

FIG. 10 is a view illustrating a method of generating a preset number of images for image synthesis according to an exemplary embodiment.

As described above, the controller 130 may control the image processor 140 to generate a plurality of images using motion information of the imaging apparatus 100 to generate a final image. Because a readout of image data is stopped or continues according to the motion information, m images may be read out through n image readout or capture attempts (n≥m, n and m are natural numbers). When m is a preset number (e.g., 4), the image processor 140 may synthesize the read out m images, and generate the final image based on the synthesized m images.

FIG. 10 illustrates a method of repeatedly reading out the image sensor 112 while performing imaging of a final image. Because motion-data is out of a preset range at time 0, the readout of the image sensor 112 is stopped or rejected due to possible image blur, and an image at time 0 is not generated. An image is normally generated at time 1, an image is not generated at time 2, and images are generated at times 3 and 4. In the exemplary embodiment, in response to four images being generated, the controller 130 synthesizes a final image using the four images. In this way, in the exemplary embodiment, for image synthesis, because a preset number of images are determined and generated in real time quickly, efficiency and usability may be increased. Further, the preset number may be set by a user in advance. Alternatively, the preset number may be set according to a purpose of the synthesized final image, and even in this case, it may not affect image generation performance.

The above-described image sensor 112 may include a CCD sensor. The imager 110 may read out image data of the image sensor 112 in frame units.

Because the image data is output in frame units, the controller 130 may control the readout process to be stopped. Therefore, like the above-described method, in response to the motion data being equal to or larger than the preset value, the read-out image may be removed from the image data based on the motion data of the imaging apparatus 100 that is in synchronization with the output of the image data. However, the controller 130 may control the image processer 140 to generate a final image using the read-out image in response to the motion data being less than the preset value.

In this way, the exemplary embodiment may infer the degree of blur in a generated image using the motion data of the imaging apparatus 100, and remove or exclude an image having the high degree of blur even when the CCD sensor is used. An image processing job in the image processor 140 may need a large amount of computation. Because the above-described method in the exemplary embodiment is performed before image processing, blur may be removed at a much faster rate than in an existing camera.

Figure 11:
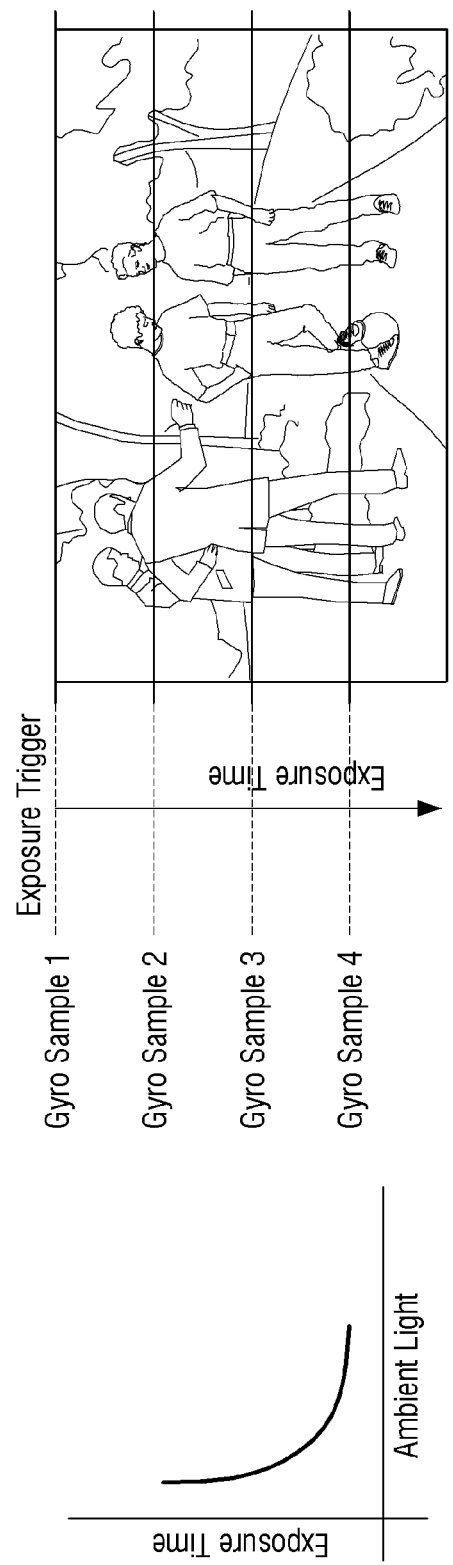
FIG. 11 is a view illustrating a method of determining a number of motion data according to an exemplary embodiment.

FIG. 11 is a view illustrating a method of determining a number of motion data according to an exemplary embodiment.

Referring to FIG. 11, the controller 130 of the imaging apparatus 100 may determine the number of motion data of the imaging apparatus 100 to be detected based on at least one among illumination, an exposure time, and a capture mode. That is, the controller 130 may determine the number of motion data that may be detected according to imaging environment conditions.

As illustrated in a left drawing of FIG. 11, as the illumination (or an ambient light) is increased, the exposure time is reduced. As illustrated in a right drawing of FIG. 11, as the exposure time is reduced, the number of acquired motion data is reduced.

In response to the illumination being low, because quality of a final image may be lowered, the number of motion data sampled may be increased. Thus, the exposure time is increased.

Further, a capture mode may be considered. For example, the capture mode may be an imaging mode for reducing noise, a super resolution mode, a still image imaging mode, a live view image imaging mode, and the like. In the super resolution mode, the number of motion data sampled and the image exposure time may be increased to obtain a high-quality image.

Figure 12:
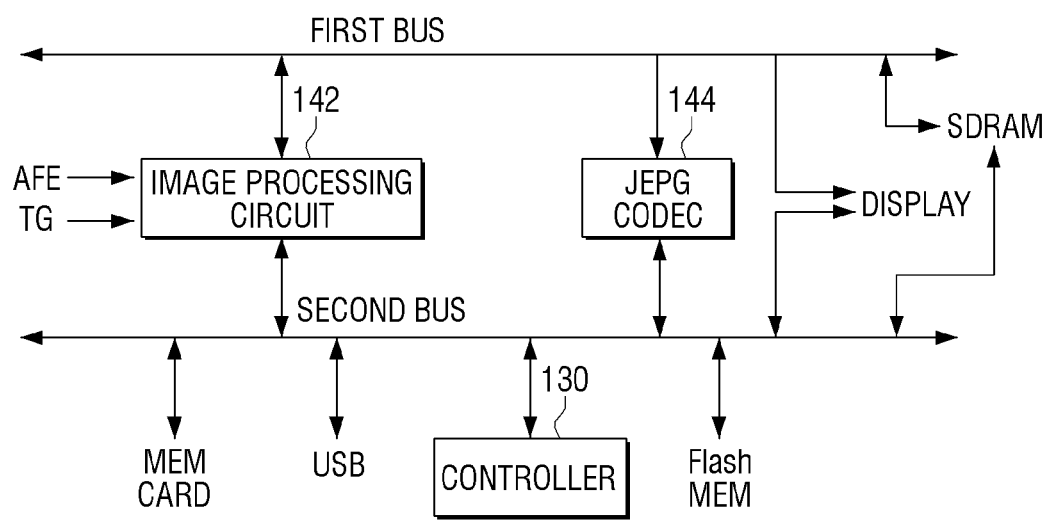
FIG. 12 is a block diagram illustrating a detailed configuration of an image processor according to an exemplary embodiment.
Figure 13:
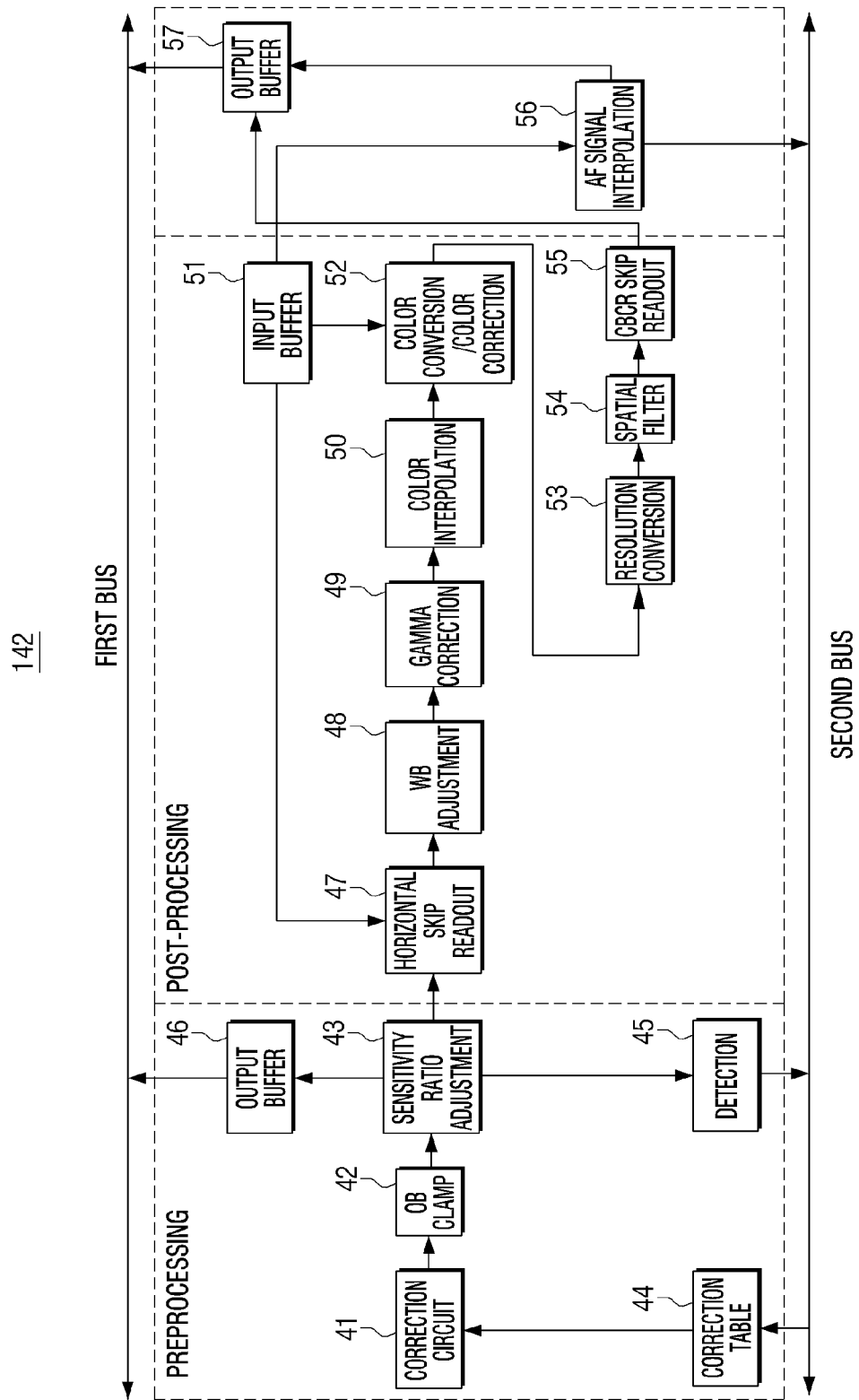
FIG. 13 is a block diagram illustrating a detailed configuration of an image processing circuit according to an exemplary embodiment.

FIG. 12 is a block diagram illustrating a detailed configuration of the image processor 140 according to an exemplary embodiment, and FIG. 13 is a block diagram illustrating a detailed configuration of an image processing circuit 142 according to an exemplary embodiment.

Referring to FIG. 12, the image processor 140 of the imaging apparatus 100 includes the image processing circuit 142 and a joint photographic experts group (JPEG) codec 144.

The image processing circuit 142 is configured to process raw image data that is output from the image sensor 112 and sampled through the AFE 113, and generate YCbCr data. Referring to FIG. 13, a correction unit 41 corrects a pixel defect of the raw image data. The correction circuit 41 corrects the pixel defect with reference to a correction table 44. Addresses of defective pixels are registered in the correction table 44. The correction of a pixel, of which an address coincides with one of the addresses in the correction table 44, is performed using neighboring pixels.

An optical black (OB) clamp circuit 42 determines a black level of an image. The image sensor 112 has an OB region, and the OB clamp circuit 42 detects a signal average value of the OB region, and determines the black level of the image through a difference between pixel values.

A sensitivity ratio adjustment circuit 43 performs sensitivity ratio adjustment differently according to colors. The sensitivity ratio adjustment circuit 43 adjusts sensitivity of R, G, and B colors under a standard light source. A gain value of a G pixel may be fixed to 1, and then a sensitivity of R and B pixels may be adjusted based on the gain value of the G pixel.

In an all readout mode in which pixels are not skipped, and data of all the pixels are read out, image data is output through an output buffer 46 after the sensitivity ratio adjustment. Because an image is generated in the all readout mode through an interlace manner, post-processing may not be immediately performed. In a skip readout mode in which all the pixels are not read out for a live view image, a moving image, or the like, portions of the pixels are read out, and remaining pixels are not read out (are skipped). Because an image is generated through a progressive manner, the post-processing may be immediately performed. In the skip readout mode, a next operation is progressed.

A skip readout circuit 47 performs skip readout, and thus a number of pixels of a raw image is reduced. As described above, the skip readout is performed through a method of leaving preset pixel lines, and discarding remaining pixel lines.

A white balance (WB) adjustment circuit 48 adjusts WB of image data. Because spectral distribution of illumination light is changed according to an imaging environment, even in response to a white subject being imaged, the subject may not be represented with white color. Signal levels of the R, G, and B pixels are adjusted by assigning different gain values to the R, G, and B pixels. A gain value of the G pixel may be fixed to 1, and then signal levels of the R and B pixels may be adjusted based on the gain value of the G pixel.

A gamma correction circuit 49 performs gamma correction on image data. A gray conversion matching with an output of the display 190 is performed through gamma correction.

A color interpolation circuit 50 generates a color image signal including three colors per one pixel from a Bayer signal including one color per one pixel.

A color conversion/color correction circuit 52 performs color space conversion matching with an output, and performs color correction. If needed, a look-up table (LUT) may be used. After the color conversion/color correction, the image data is YCrCb data.

A resolution conversion circuit 53 converts a resolution and adjusts a size of the YCrCb data.

A spatial filter circuit 54 performs spatial filter processing on image data. Edge-emphasis on a Y signal is performed, and low-pass filter (LPF) processing on Cb/Cr signals is performed.

A CbCr skip readout circuit 55 performs skip readout on the Cb/Cr signals, and converts the Cb/Cr signals to image data of YCbCr4:2:2. The image data is output through an output buffer 57, and is stored in the SDRAM 160 through a first bus.

In the all readout mode, readout may be performed through an interlace manner. Because neighboring pixel lines are not presented, direct color interpolation may not be processed. Therefore, after the pre-processing is completed, orders of pixel lines are adjusted, and then image data is stored in the SDRAM 160 through the output buffer 46 in a progressive form. The image data is read out again, and input to the image processing circuit 142 through an input buffer 51.

However, the read out in the all readout mode in the exemplary embodiment is not limited to the interlace method, and the readout may be implemented with the progressive method in the all readout mode.

After a still image is imaged, a preview image or a thumbnail image in which an image is viewed in a small size may need to be generated. The image may be created by omitting data in partial pixels as in the skip readout mode.

Even in response to a continuous shooting function on a still image being performed at a short time interval, a phase difference may need to be quickly detected, and thus technology of the above-described method may be applied.

An autofocus (AF) signal interpolation circuit 56 interpolates phase difference pixel portions with general pixel values. The phase difference pixels may be located between the general pixels. When the phase difference pixel portions are used as they are, degradation in resolution may be caused. Therefore, the interpolation is performed using neighboring general pixels.

Referring again to FIG. 12, the JPEG codec 144 is configured to compress YCbCr data. The compressed image data is stored in the SDRAM 160. The controller 130 reads the compressed image data stored in the SDRAM 160, and stores the read image data in the memory card 170, and thus an image generation process is completed.

The imaging apparatus 100 according to the above-described exemplary embodiments may include a technical configuration configured to perform auto focusing using a phase difference pixel or contrast auto focusing. The imaging apparatus 100 may be implemented with hybrid auto focusing technology using both the phase difference auto focusing and contrast auto focusing.

Hereinafter, imaging methods according to exemplary embodiments will be described with reference with the accompanying drawings.

FIGS. 14 to 17 are flowcharts illustrating imaging methods according to exemplary embodiments.

Figure 14:
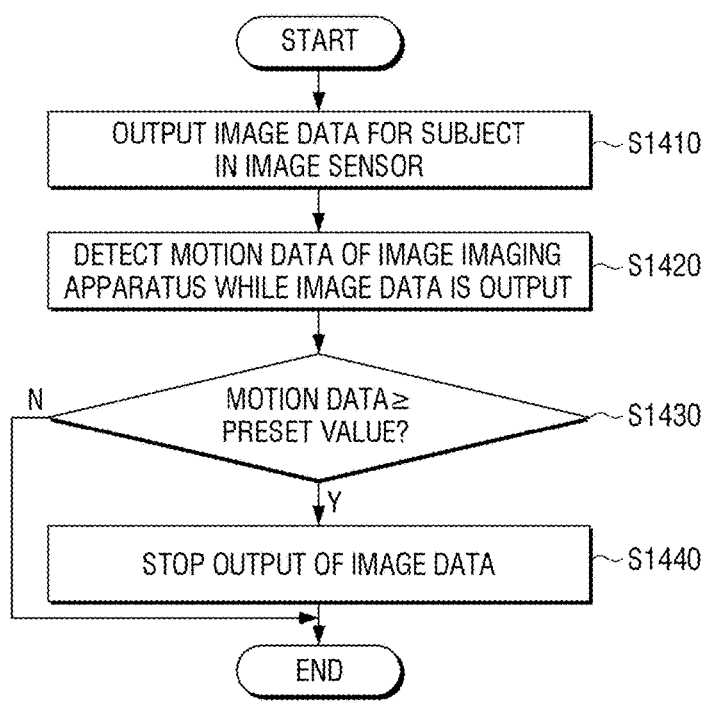
FIGS. 14 to 17 are flowcharts illustrating imaging methods according to exemplary embodiments.

Referring to FIG. 14, an imaging method according to an exemplary embodiment includes outputting image data for a subject in an image sensor (S1410), detecting motion data of an imaging apparatus while the image data is output (S1420), and stopping the output of the image data (S1440) in response to the motion data being equal to or larger than a preset value (S1430-Y).

Figure 15:
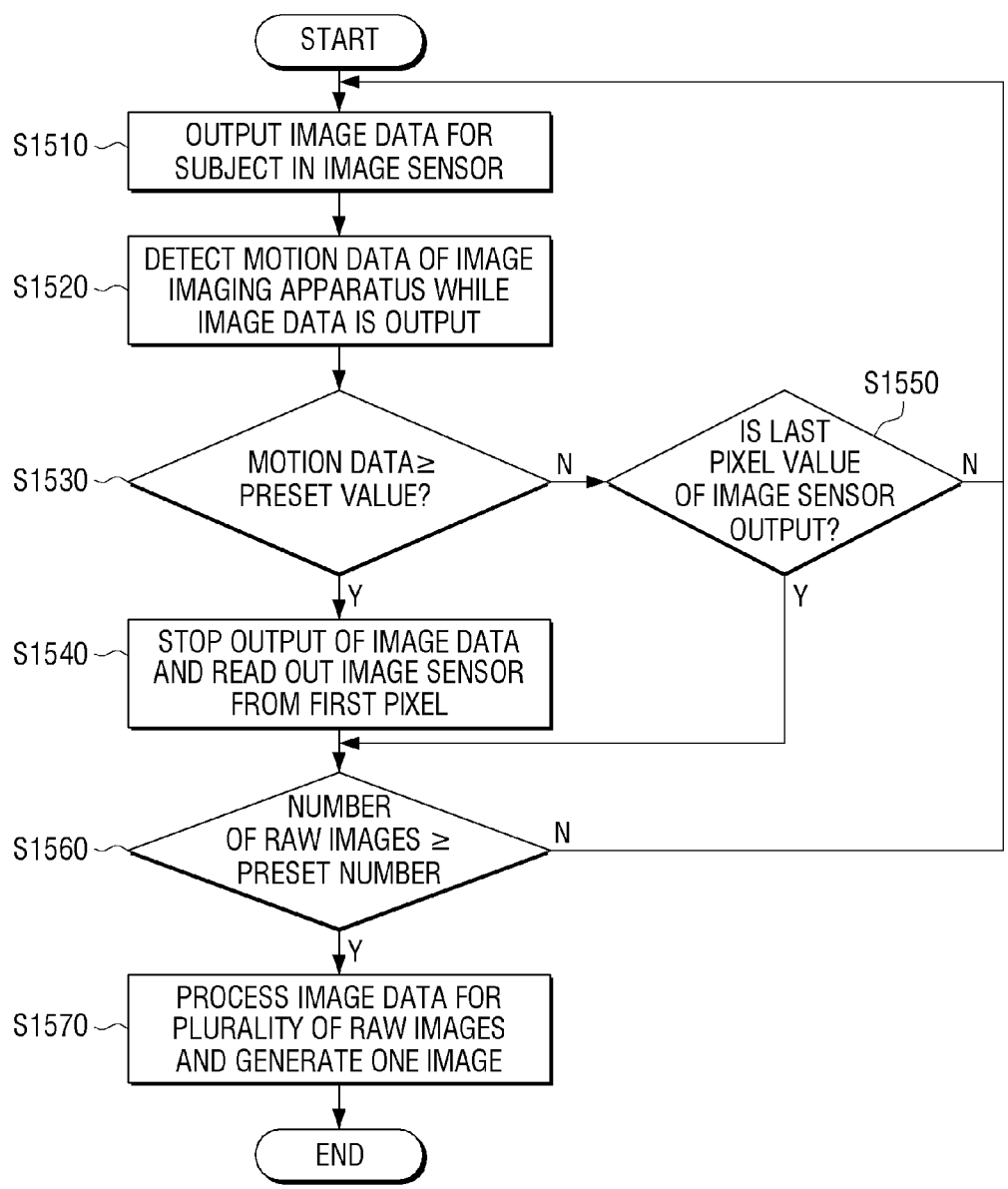

Referring to FIG. 15, an imaging method according to another exemplary embodiment includes outputting image data for a subject in an image sensor (S1510), detecting motion data of an imaging apparatus while the image data is output (S1520), and stopping the output of the image data and reading out the image sensor from a first pixel of the image sensor again (S1540) in response to the motion data being equal to or larger than a preset value (S1530-Y). The imaging method further includes determining whether a last pixel value of the image sensor is output (S1550) in response to the motion data being less than the preset value (S1530-N).

In response to the last pixel value of the image sensor being output (S1550-Y), because the image data that can generate one image frame is read out, the imaging method further includes determining whether a number of raw images of the output image data is greater than or equal to a preset number (S1560). In response to the number of raw images being greater than or equal to the preset number (S1560-Y), the imaging method further includes processing the image data for a plurality of raw images, and generating one image based on the processed image data(S1570).

The image sensor according to the exemplary embodiments may include a CMOS sensor.

The motion data may be detected using at least one among an acceleration sensor, an angular velocity sensor, and a gyroscope.

The imaging method may further include setting ranks for a plurality of generated images based on the detected motion data of the imaging apparatus corresponding to the image data for the plurality of generated images.

Figure 16:
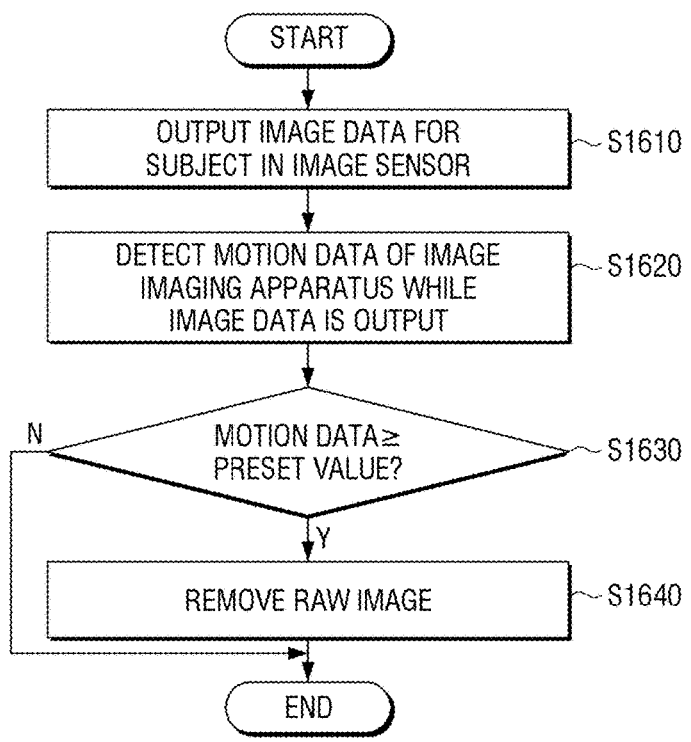

Referring to FIG. 16, an imaging method according to another exemplary embodiment includes outputting image data for a subject in an image sensor (S1610), detecting motion data of an imaging apparatus while the image data is output (S1620), and removing a raw image from the output image data (S1640) in response to the motion data being equal to or larger than a preset value (S1630-Y).

Figure 17:
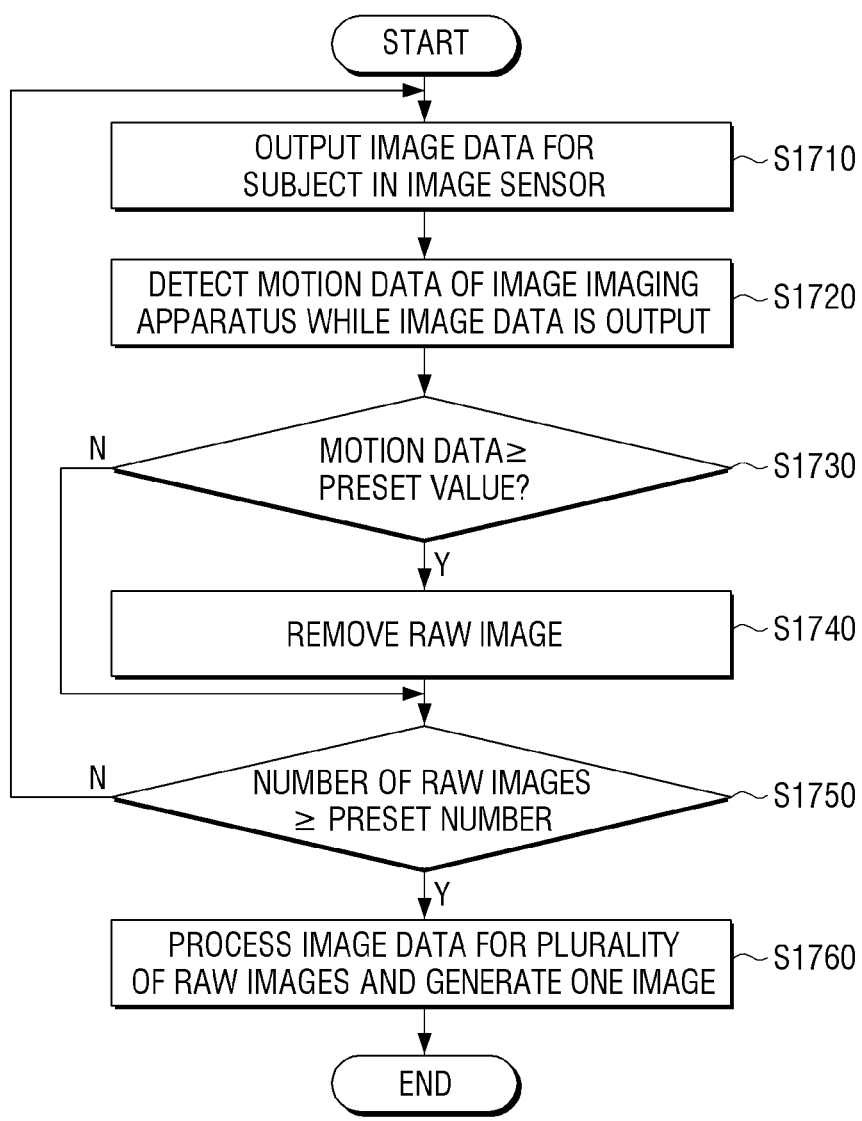

Referring to FIG. 17, an imaging method according to another exemplary embodiment includes outputting image data for a subject in an image sensor (S1710), detecting motion data of an imaging apparatus while the image data is output (S1720), and removing a raw image from the output image data (S1740) in response to the motion data being equal to or larger than a preset value (S1730-Y).

The imaging method further includes determining whether or not a number of raw images of the output image data is greater than or equal to a preset number (S1750). The imaging method further includes processing the image data for a plurality of raw images, and generating one image based on the processed image data (S1760) in response to the number of raw images being greater than or equal to the preset number (S1750-Y).

The image sensor in the exemplary embodiments may include a CCD sensor.

The motion data may be detected using at least one among an acceleration sensor, an angular velocity sensor, and a gyroscope sensor.

The imaging method may further include setting ranks for a plurality of generated images based on the detected motion data of the imaging apparatus corresponding to the image data for the plurality of generated images.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary embodiments and are not to be construed as limiting the exemplary embodiments. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An imaging apparatus comprising:
   an imager configured to output image data of a plurality of pixels of an image frame for a subject sequentially from a first pixel in a first row and a first column of the image frame to a last pixel in a last row and a last column of the image frame;
   a motion detector configured to detect motion of the imaging apparatus; and
   a controller configured to control the imager to:
      suspend output of remaining image data of a remaining pixel of the image frame in response to the detected motion being greater than or equal to a value; and
      restart output of the image data of the plurality of pixels sequentially from the first pixel in response to the detected motion being less than the value after the output of the remaining image data is suspended.

2. The imaging apparatus as claimed in claim 1, wherein the imager comprises a complementary metal oxide semiconductor sensor.

3. The imaging apparatus as claimed in claim 1, wherein the motion detector comprises at least one among an acceleration sensor, an angular velocity sensor, and a gyroscope.

4. The imaging apparatus as claimed in claim 1, wherein the motion detector is further configured to continuously detect the motion.

5. The imaging apparatus as claimed in claim 1, further comprising an image processor configured to process the output image frame.

6. The imaging apparatus as claimed in claim 5, wherein the controller is further configured to control the image processor to generate an image, based on the output image frame, in response to the imager outputting the image frame.

7. The imaging apparatus as claimed in claim 5, wherein the controller is further configured to set ranks for a plurality of images, based on the detected motion corresponding to the output image frame, in response to the imager outputting the image frame.

8. The imaging apparatus as claimed in claim 7, wherein the controller is further configured to control the image processor to generate an image, based on the set ranks.

9. The imaging apparatus as claimed in claim 5, wherein the controller is further configured to control the image processor to generate an image, based on the output image frame, in response to the imager outputting a number of image frames.

10. The imaging apparatus as claimed in claim 1, wherein the controller is further configured to set ranks for a plurality of images for which each of respective motions of the imaging apparatus is less than the value, based on the detected motion corresponding to the output image frame, in response to the imager outputting the image frame, the plurality of images comprising the output image frame, and the detected motion corresponding to the output image frame being less than the value,
    a first image corresponding to a lowest motion of the imaging apparatus among the plurality of images is set to have a highest ranking among the plurality of images,
    a second image corresponding to a middle motion of the imaging apparatus among the plurality of image is set to have a middle ranking among the plurality images, and
    a third image corresponding to a highest motion of the imaging apparatus among the plurality of images is set to have a lowest ranking among the plurality of images.

11. An imaging apparatus comprising
    an imager configured to output image data of a plurality of pixels of an image frame for a subject sequentially from a first pixel in a first row and a first column of the image frame to a last pixel in a last row and a last column of the image frame;
    a motion detector configured to detect motion of the imaging apparatus; and
    a controller configured to control the imager to:
       suspend output of remaining image data of a remaining pixel of the image frame, and exclude the output image data from image synthesis, in response to the detected motion being greater than or equal to a value; and
       restart output of the image data of the plurality of pixels sequentially from the first pixel in response to the detected motion being less than the value after the output of the remaining image data is suspended.

12. The imaging apparatus as claimed in claim 11, wherein the imager comprises a charge-coupled device sensor.

13. The imaging apparatus as claimed in claim 11, wherein the motion detector comprises at least one among an acceleration sensor, an angular velocity sensor, and a gyroscope.

14. The imaging apparatus as claimed in claim 11, further comprising an imaging processor configured to process the output image frame.

15. The imaging apparatus as claimed in claim 14, wherein the controller is further configured to control the image processor to generate an image, based on the output image frame, in response to the imager outputting the image frame.

16. The imaging apparatus as claimed in claim 14, wherein the controller is further configured to set ranks for a plurality of images, based on the detected motion corresponding to the output image frame, in response to the imager outputting the image frame.

17. The imaging apparatus as claimed in claim 16, wherein the controller is further configured to control the image processor to generate an image, based on the set ranks.

18. The imaging apparatus as claimed in claim 14, wherein the controller is further configured to control the image processor to generate an image, based on the output image frame, in response to the imager outputting a number of image frames.

19. The imaging apparatus as claimed in claim 11, wherein the controller is further configured to determine a number of motion data to be detected by the motion detector, based on imaging environment conditions.

20. An imaging method of an imaging apparatus, the imaging method comprising:
   outputting image data of a plurality of pixels of an image frame for a subject sequentially from a first pixel in a first row and a first column of the image frame to a last pixel in a last row and a last column of the image frame;
   detecting motion of the imaging apparatus;
   suspending output of remaining image data of a remaining pixel of the image frame in response to the detected motion being greater than or equal to a value; and
   restarting output of the image data of the plurality of pixels sequentially from the first pixel in response to the detected motion being less than the value after the output of the remaining image data is suspended.

21. The imaging method of claim 20, further comprising:
   determining whether a number of image frames that are output is greater than or equal to another value; and
   processing the output image frames in response to the determining that the number of the image frames is greater than or equal to the other value, to generate an image.

22. An imaging method of an imaging apparatus, the imaging method comprising:
   outputting image data of a plurality of pixels of an image frame for a subject sequentially from a first pixel in a first row and a first column of the image frame to a last pixel in a last row and a last column of the image frame;
   detecting motion of the imaging apparatus;
   suspend output of remaining image data of a remaining pixel of the image frame, and excluding the output image data from image synthesis, in response to the detected motion being greater than or equal to a value; and
   restarting out of the image data of the plurality of pixels sequentially from the first pixel in response to the detected motion being less than the value after the output of the remaining image data is suspended.

* * * * *